US006444758B2

(12) United States Patent
McNamara et al.

(10) Patent No.: US 6,444,758 B2
(45) Date of Patent: Sep. 3, 2002

(54) HYPERBRANCHED AMPHIPHILIC POLYMERIC ADDITIVES AND POLYMER COMPOSITIONS WITH INCREASED SURFACE ENERGY

(75) Inventors: John James McNamara, Putnam Valley, NY (US); Anunay Gupta, Holmdel, NJ (US); David Devore, Nyack, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/778,194

(22) Filed: Feb. 7, 2001

Related U.S. Application Data

(60) Provisional application No. 60/181,332, filed on Feb. 9, 2000.

(51) Int. Cl.$^7$ .................. C08F 262/02; C08F 20/62; C08G 63/48
(52) U.S. Cl. .............. 525/302; 525/305; 525/306; 525/309; 525/314; 525/71; 525/51; 525/57; 525/58; 525/60; 525/437
(58) Field of Search ................. 525/302, 305, 525/306, 309, 314, 71, 51, 57, 58, 60, 437

(56) References Cited

U.S. PATENT DOCUMENTS

| | | | |
|---|---|---|---|
| 3,441,953 A | 4/1969 | Dumont et al. | 117/139.5 |
| 3,669,939 A | 6/1972 | Baker et al. | 260/78 A |
| 5,041,516 A | 8/1991 | Fréchet et al. | 528/44 |
| 5,136,014 A | 8/1992 | Figuly | 528/272 |
| 5,217,573 A | 6/1993 | Tsai et al. | 162/5 |
| 5,240,985 A | 8/1993 | Gardiner | 524/274 |
| 5,272,196 A | 12/1993 | Gardiner | 524/252 |
| 5,281,438 A | 1/1994 | Gardiner et al. | 427/256 |
| 5,328,951 A | 7/1994 | Gardiner | 524/287 |
| 5,362,843 A | 11/1994 | Vicari et al. | 528/271 |
| 5,418,301 A | 5/1995 | Hult et al. | 525/437 |
| 5,464,691 A | 11/1995 | Gardiner et al. | 428/336 |
| 5,663,247 A | 9/1997 | Sörensen et al. | 525/533 |
| 5,721,322 A | 2/1998 | Lu et al. | 525/404 |
| 5,777,129 A | 7/1998 | Juneau et al. | 548/455 |
| 6,172,180 B1 * | 1/2001 | Hancock et al. | 528/391 |

FOREIGN PATENT DOCUMENTS

| | | |
|---|---|---|
| EP | 1026185 | 8/2000 |
| GB | 2339202 | 1/2000 |
| WO | 93/21259 | 10/1993 |
| WO | 96/13558 | 5/1996 |
| WO | 96/19537 | 6/1996 |
| WO | 97/23538 | 7/1997 |
| WO | 97/23539 | 7/1997 |
| WO | 97/45474 | 12/1997 |
| WO | 97/49781 | 12/1997 |
| WO | 98/12376 | 3/1998 |
| WO | 99/00439 | 1/1999 |
| WO | 99/00440 | 1/1999 |
| WO | 00/11058 | 3/2000 |
| WO | 00/77070 | 12/2000 |
| WO | 07/74946 | 10/2001 |

OTHER PUBLICATIONS

C. Hawker et al., Chapter 10, Design, Synthesis, and Properties of Dendritic Macromolecules, pp. 186–196 (1996).
A. Hult et al., Advances in Polymer Science, vol. 143, pp. 1–34, (1999).
D. Schmaljohann et al., Polymeric Materials Science and Engineering, vol. 77, (1997) p. 173.
J. Salamone, Polymeric Materials Encyclopedia, vol. 5, Highly Branched Polymers, (1996) pp. 3049–3053.
J. Roovers et al., Advances in Polymer Science, vol. 142, (1999), pp. 179–228.
D. Tomalia et al., Angew. Chem. Int. Ed. Engl. vol. 29, (1990), pp. 138–175.
E. Malmström et al., Macromolecules, vol. 28, (1995), pp. 1698–1703.
K. Wooley et al., J. Chem. Soc. Perkin Trans. I, (1991), pp. 1059–1076.
C. Hawker et al., J. Am. Chem. Soc., vol. 112, No. 21, (1990), pp. 7638–7647.
D. Bergbreiter et al. Macromolecules, (1992), vol. 25, pp. 636–643.
Abstract for EP 1026185 (2000).
K. Wooley et al., "The Preparation of Hybrid Dendritic–Linear Block Polymers", Proceedings of the American Chemical Society, Division of Polymeric Materials, Science and Engineering, vol. 66, (1992), pp. 90–91.

* cited by examiner

Primary Examiner—James J. Seidleck
Assistant Examiner—Olga Asinovsky
(74) Attorney, Agent, or Firm—Tyler A. Stevenson

(57) ABSTRACT

The surface energy of polymeric substrates is increased by the application or incorporation of novel amphiphilic block copolymers. The block copolymer additives comprise a linear hydrophilic polymer or oligomer and a random hyperbranched polymer or oligomer and is completely or partially terminated with lipophilic end groups. The polymeric articles or constructions which benefit from the application or incorporation of the amphiphilic block copolymers in the areas of anti-fog, dissipation of static electricity, paintability, dyeability, printability, wicking of moisture, adhesion and polymer compatibility include carpet fibers, composite fibers, agricultural films, nonwoven coverstock, exterior automotive bumper fascia, packaging, hygienic products, incompatible polymer blends, laminated articles and eyewear.

19 Claims, No Drawings

HYPERBRANCHED AMPHIPHILIC POLYMERIC ADDITIVES AND POLYMER COMPOSITIONS WITH INCREASED SURFACE ENERGY

This application claims the benefit under 35 USC 119(e) of U.S. Provisional Application Ser. No. 60/181,332 filed on Feb. 9, 2000.

The present invention relates to novel asymmetric hyperbranched copolymers, a process for their preparation, and to their use as polymer additives that migrate to the surface of a polymer and have beneficial effects on the surface properties of the polymer.

Random hyperbranched polymers are known. Hyperbranched polymers are obtained from the random polymerization of monomers in the presence of at least one polyfunctional monomer capable of introducing branching. Such a synthetic scheme is shown by Hawker and Devonport in "Step-Growth Polymers for High-Performance Materials: New Synthetic Methods," Hedrick, J. L. and Labadie, J. W., Eds., Am. Chem. Soc., Washington, D.C., 1996, pp. 191–193. Hult, et al., in "Advances in Polymer Science," Vol. 143 (1999), Roovers, J., Ed., Springer, New York, pp. 1–34, present a review of hyperbranched polymers.

U.S. Pat. No. 3,441,953 teaches that discrete esters of certain hindered dihydroxycarboxylic acids possess desirable properties and which may be used as textile softeners, lubricants, wetting and rewetting agents and textile assistants and which impart properties such as improved softness, scorch resistance, wettability and rewettability, static control, lubricity, tensile and tear strengths and sewability to textile materials. An example is given where polyethylene glycol (PEG) is reacted with dimethylolpropionic acid (2,2-bis(hydroxymethyl)propionic acid or BMPA) to form a PEG monoester of BMPA. This diol-ester is subsequently reacted with a tallow fatty acid to form the tallow fatty acid diester. In fact, it is believed that in the first step that a discrete PEG-BMPA monoester is not formed but that some hyperbranching must have occurred, resulting in a hyperbranched polyester.

Functionalization or end-capping of hyperbranched polymers with various groups is known.

WO97/23538 and WO97/23539 disclose highly branched epoxide functional and alkenyl functional polyesters respectively. The polyester is prepared by self-condensing a di, tri, or polyhydroxy functional monocarboxylic acid monomer and which polyester contains at least one carboxyl group and multi hydroxyl groups. The polyester is reacted with an epoxide containing compound such as epichlorohydrin or a compound containing an oxidizable unsaturation to introduce the epoxide functionality. Likewise, it is reacted with a compound containing allylic or acrylic groups to introduce the alkenyl functionality.

U.S. Pat. No. 3,669,939 discloses highly branched self-condensates of polyhydroxymonocarboxylic acids, for example dimethylolpropionic acid. Monocarboxylic acids may be present in the condensation reaction. The resulting resins are useful in coating compositions.

U.S. Pat. No. 5,136,014 discloses hyperbranched polyester polymers and copolymers that may be chemically capped, crosslinked, or copolymerized with diols or dicarboxylic acids. Suitable capping agents include anhydrides, acyl chlorides, isocyanates and benzylisothiocyanate.

Schmaljohann, et al., Polymeric Materials Science and Engineering, 77 (1997), p. 173, discloses that hyperbranched aromatic polyesters and a hyperbranched polyester based on self-condensation of 2,2-bis(hydroxymethyl)propionic acid may be functionalized with alkyl acid chlorides of 2 to 18 carbon atoms, resulting in hyperbranched polyesters with an amphiphilic character.

Highly branched dendritic polymers are well known, as discussed for example in "Polymeric Materials Encyclopedia," Vol. 5 (1996), J.C. Salamone, Ed., CRC Press, New York, pp. 3049–3053. Dendritic polymers have a non-linear architecture and are intrinsically globular in shape. Discrete, stepwise synthetic methods are used to prepare highly branched pure compounds, or dendrimers. As discussed by Hawker and Devonport in "Step-Growth Polymers for High-Performance Materials: New Synthetic Methods," Hedrick, J. L. and Labadie, J. W., Eds., Am. Chem. Soc., Washington, D.C., 1996, pp. 186–196, if the macromolecule has highly regular branching which follows a strict geometric pattern, it is a dendrimer. Dendrimers are typically monodisperse and are prepared in a multi-step approach with purifications at each stage.

The architecture of dendrimers is also discussed by Roovers and Comanita in "Advances in Polymer Science," Vol. 142 (1999), Roovers, J., Ed., Springer, New York, pp. 179–228. Dendrimers consist of a core molecule which defines the center of symmetry of the molecule, and branching layers. Tomalia, et al., in Angew. Chem. Int. Ed. Eng., 29 (1990), 138–175 disclose "starburst" dendrimers which consist of an initiator core and branching groups.

Hyperbranched macromolecules result if the branching is random and irregular and are therefore not monodisperse. There are significant amounts of failure sequences present in such hyperbranched macromolecules. As discussed by Malmstroem, et al., in Macromolecules, 28 (1995), 1698–1703, a hyperbranched material contains a mixture of linear and fully branched A repeating units and has a degree of branching of less than unity. An ideal dendritic substance has a degree of branching of unity.

It is taught in WO 99/00439 and WO 99/00440 that dendrimers are highly symmetric, while similar macromolecules designated as hyperbranched and/or dendritic may to a certain degree hold an asymmetry, yet maintaining the highly branched tree-like structure.

U.S. Pat. No. 5,418,301 teaches polyester-based dendritic macromolecules and their use as an alternative to conventional polyester alkyd resins. The dendritic macromolecules are built from a symmetric central initiator molecule or initiator polymer and a monomeric chain extender having one carboxyl and two hydroxyl groups and is optionally capped with a chain stopper. The macromolecules described therein are prepared in a stepwise fashion. The exemplified central initiator molecules are ditrimethylolpropane, trimethylolpropane and ethoxylated pentaerythritol. It is taught that the central initiator compound may be an alkoxylate polymer such as polyethylene glycol or polypropylene glycol as well as polytetrahydrofuran.

U.S. Pat. No. 5,663,247 discloses dendritic or near dendritic hyperbranched polyester-based macromolecules that comprise a central nucleus, a monomeric or polymeric chain extender with at least three reactive sites and optionally a chain stopper. The central nucleus is an epoxide compound with at least one reactive epoxide group. The chain extender has at least one hydroxyl group and at least carboxyl or epoxy group. The chain extender may be for example dimethylolpropionic acid. The examples given employ a stepwise preparation and employ as the nucleus a bisphenol A-diglycidyl ether and triglycidyl isocyanurate.

WO 96/13558 discloses a binder composition comprised of at least one unsaturated monomer and at least one unsaturated polyester. The unsaturated polyester is a dendritic or hyperbranched macromolecule comprising a nucleus, a chain extender, and a chain stopper. The nucleus has at least one reactive hydroxyl or epoxide group. The chain extender has at least two reactive hydroxyl groups and at least one reactive carboxyl group. The unsaturation in the polyester is introduced through the chain stopper. Stepwise methods are disclosed for the preparation of the polyesters. The exemplified polyesters are prepared from a nucleus of ethoxylated pentaerythritol.

WO 96/19537 discloses thermosetting materials such as composites with increased toughness with the incorporation of functionalized polyester dendritic or hyperbranched macromolecules in the thermosetting resin. The polyester macromolecules contain at least one primary or secondary reactive site. The macromolecules are built from a nucleus having at least one reactive epoxide or hydroxyl group, a chain extender with at least two reactive hydroxyl groups and at least one reactive carboxyl group and a chain stopper. The reactive sites are introduced through the chain termination. The disclosed polyesters are prepared in a stepwise fashion. The exemplified polyesters are prepared from a nucleus of pentaerythritol pentaethoxylate.

WO 97/49781 discloses a refrigeration working fluid comprising a lubricant comprising at least one chain terminated dendritic or hyperbranched polyester macromolecule and a refrigerant. The polyesters are composed of a nucleus, a chain extender and a chain terminator. The nucleus is a mono, di, tri, or polyfunctional alcohol or epoxide. The chain extender is an hydroxy functional carboxylic acid and the chain terminator is a aliphatic carboxylic acid. The exemplified end-capped hyperbranched polyesters are prepared in a stepwise fashion with a nucleus of either neopentyl glycol or trimethylolpropane.

WO 97/45474 discloses thermoplastic polymers grafted with hyperbranched dendritic polyester macromolecules. The polyester macromolecules consist of a nucleus, a chain extender and an optional chain stopper. The nucleus has at least one reactive epoxide, hydroxyl, carboxyl or anhydride group. The chain extender has at least three reactive groups of which at least one is a hydroxyl group and at least one is a carboxyl or anhydride group. The optional chain stopper may be for example an aliphatic carboxylic acid. The exemplified hyperbranched dendritic polyesters are prepared according to a stepwise method with pentaerythritol pentaethoxylate as the nucleus.

WO 99/00439 discloses a process for the preparation of hyperbranched dendritic polyester alcohols. The polyester alcohols (polymeric polyalcohols or polyols) have a symmetrical or near symmetrical highly branched structure. The polymeric polyalcohols are composed of an initiator molecule with one or more reactive groups and branching chain extender molecules with three functional groups of which two are hydroxyl groups and one is a group reactive to the initiator molecule and/or hydroxyl groups. The two hydroxyl groups of the branching chain extender are acetal protected during the addition. Deprotection and subsequent addition of another generation of acetal protected chain extenders, etc., yields highly branched symmetrical dendrimers. WO 99/00440 discloses a similar process towards the preparation of the same polymeric polyalcohols. A double stage convergent synthesis is taught wherein the nucleus (initiator molecule) has one or more hydroxyl or epoxide groups. The branching chain extender molecules have three functional groups of which two are hydroxyl groups and one is a carboxyl group. The branching generations are prepared first from ketal protected chain extenders and a carboxyl protected chain extender and deprotection/subsequent reaction steps. After deprotecting the carboxyl group, the prepared branches are then coupled to the nucleus molecule. U.S. Pat. No. 5,041,516 discloses a stepwise "convergent" process for the preparation of polyaromatic ether and polyamide dendrimers.

Linear polymer-dendrimer hybrids are known.

WO 93/21259 discloses dendritic macromolecules of specific shapes such as barbells, kites, triblocks and knot shaped molecules and a stepwise method for their preparation. Several of these specially shaped macromolecules may be prepared by stepwise methods with the incorporation of a linear polymer such as a polyalkyl ether or a polystyrene. The dendritic polymer groups with unique reactive sites are preferable prepared by the convergent growth method as disclosed in U.S. Pat. No. 5,041,516. All of the examples are performed with polyaromatic ethers which are true dendrimers prepared by a convergent method as disclosed in U.S. Pat. No. 5,041,516, *J. Am. Chem. Soc.* 112 (1990), 7638–7647 and J. Chem. Soc. Perkin Trans. I (1991), 1059–1076. A broad range of possible uses for the specially shaped compounds is envisioned, including surface modification and compatibilization. Roovers and Comanita in "Advances in Polymer Science," Vol. 142 (1999), Roovers, J., Ed., Springer, New York, pp. 211–216 disclose similar hybrid macrmolecules. The functional dendrimers are reacted with a linear polymer to form the hybrids.

The use of polyalkylene oxide polymers towards effecting the surface properties of a polymer is known.

Bergbreiter and Srinivas in *Macromolecules* 25 (1992), 636–643, disclose an "entrapment functionalization" approach towards modifying the surface of high-density polyethylene. Block cooligomers of polyethylene and poly(ethylene glycol) are prepared and intimately mixed with virgin polyethylene. Analysis of polymer films prepared from this mixture showed that the poly(ethylene glycol) units ended up primarily at the outermost layers of the film.

U.S. Pat. No. 5,217,573 teaches a method for removing laser printer and xerographic toner, ink or the like from paper by alkaline washing and flotation in the presence of a surfactant which has two lipophilic groups and one hydrophilic group. The lipophilic groups are derived from rosin acids and the hydrophilic group is derived from polyethylene glycol.

U.S. Pat. No. 5,464,691 discloses the use of an amphiphilic resin towards modifying the surface energy of a polyolefin. The amphiphilic resins are composed of hydrocarbon sections and a polar section. The hydrocarbon sections are derived from, for example, long-chain aliphatic carboxylic acids and the polar section is derived from a telechelic diol, for example polyethylene glycol.

U.S. Pat. No. 5,721,322 discloses a method for increasing the surface activity of non-polar polymeric materials, in particular polyolefins and polystyrenes, with the incorporation of a triblock copolymer. The triblock copolymer has two sections compatible with the host polymer, for example long-chain aliphatic groups. The center section is derived from a polyepichlorohydrin telomer.

U.S. Pat. Nos. 5,240,985, 5,272,196, 5,281,438, 5,328, 951 disclose the use of an amphiphile towards increasing the surface energy of polyolefins. The amphiphile consists of a central hydrophilic component and two lipophilic components. The hydrophilic component is derived from, for example, polyglycols and the lipophilic components are derived from, for example fatty acids.

It has now been found that certain amphiphilic block copolymer additives are particularly effective towards increasing the surface energy of polymeric substrates. The amphiphilic block copolymers are novel and are comprised of a linear hydrophilic polymer, a hyperbranched polymer, and lipophilic end groups. The linear hydrophilic polymer is the core or nucleus from which the branching is initiated. The hyperbranched sections are random and irregular and contain failure sequences; they are not dendrimers.

DETAILED DISCLOSURE

Accordingly, a subject of this invention are novel (A)(B) and (B)(A)(B) amphiphilic block copolymers wherein
(A) is a linear hydrophilic polymer or oligomer,
(B) is a random hyperbranched polymer or oligomer, and
wherein said block copolymers are completely or partially terminated with lipophilic groups.

The hydrophilic polymer or oligomer component (A) is derived from a mono or di-functional telechelic polymer or oligomer and may itself be a homopolymer, block copolymer, random copolymer or alternating copolymer, or the corresponding oligomers.

Preferably, component (A) is derived from a homopolymer, block copolymer, random copolymer or alternating copolymer selected from the group consisting of poly(acrylate)s, poly(methacrylate)s, polyesters, poly(alkylene diol)s, poly(alkylene diol) monoalkyl ethers, poly(aryl ether)s, poly(vinyl alcohol)s, poly(acrylamide)s, poly(urea)s, poly(urethane)s, poly(methacrylamide)s, poly(ethylene imine)s, poly(vinyl ether)s, poly(vinyl ester)s, poly(epichlorohydrin), poly(glycidyl ether)s, poly(glycidyl ester)s, poly(carbonate)s, poly(thio ether)s, poly(thio ester)s, poly(alkyl sulfone)s, poly(aryl sulfone)s, poly(amino acid)s, polyamides, epoxy resins, novolac resins and quaternary ammonium polyacrylates and polyamines.

Quaternary ammonium polyacrylates are for example poly(diallyldimethylammonium chloride) (polyDADMAC), poly(dimethylaminoethylacrylate) (polyDMAEA) and poly(diethylaminoethylacrylate) (polyDEAEA). Polyamides are for example Nylon 6,6.

Also preferably, component (A) is derived from a linear homopolymer with an $\overline{M}n$ between 300 and 500,000 daltons.

Especially preferred as precursors for component (A) are poly(acrylate), poly(methacrylate), poly(alkylene diol), poly(alkylene diol) monoalkyl ether, poly(aryl ether), poly(acrylamide), poly(methacrylamide), poly(ethylene imine), poly(vinyl ether) and poly(vinyl ester) linear homopolymers with an $\overline{M}n$ between 300 and 5,000 daltons.

Most preferred as precursors for component (A) are the poly(alkylene diol)s, for example poly(ethylene glycol)s and poly(propylene glycol)s and the corresponding monoalkyl ethers.

Deserving of special mention as precursors for component (A) are the monoalkyl ethers of poly(ethylene glycol) with an $\overline{M}n$ between 300 and 5,000 daltons.

The reactive functional groups (a) of the telechelic polymer or oligomer precursor for (A), and through which the linkage with the hyperbranched component (B) is formed, are located on one or both ends of the polymer or oligomer chain.

The reactive functional group (a) may be, for example, —OH, —NHR, —NH$_2$, —SH, —SO$_2$H, —CO$_2$H, —COX, —CSOH, —COSH, —CS$_2$H, —NCO, epoxy, epoxy ether, epoxy ester and X, wherein X is Cl, Br or I and R is a linear or branched chain alkyl of 1 to 30 carbon atoms.

The random hyperbranched polymer or oligomer component (B) is derived from at least one multi-functional monomer which may undergo self-condensation to produce a highly branched structure. The monomer or monomers have at least two different functional groups, (b) and (c), reactive with each other. The monomer or monomers contain one group (b) and two or more groups (c). Group (b) is also reactive with group (a), which reaction forms the linkage which is the focal point for the branching structure.

The random hyperbranched polymer or oligomer component (B) may itself be a homopolymer or a random copolymer or the corresponding oligomers.

Groups (b) and (c) have the same definition as (a) with the provisos that (b) and (c) are not equivalent and that (b) is reactive with (c).

Examples of multi-functional monomers useful in the present invention are those that have one carboxylic acid group (b) and two hydroxyl groups (c) or one carboxylic acid group (b) and two amine groups (c).

The multi-functional monomers may be for example dimethylolpropionic acid (2,2-bis (hydroxymethyl) propionic acid, or BMPA), α,α-bis-(hydroxymethyl)-butyric acid, α,α,α-tris (hydroxymethyl)-acetic acid, α,α-bis (hydroxymethyl)-valeric acid, α,α-bis(hydroxy)propionic acid, α-phenylcarboxylic acids having at least two hydroxyl groups directly pendant to the phenyl ring (phenolic hydroxyl groups) such as 3,5-dihydroxybenzoic acid or amino acids such as serine, lysine, threonine, tyrosine, aspartic acid, glutamic acid and cysteine.

Above monomers wherein one or more of the hydroxyl groups are hydroxyalkyl substituted can possibly also be used as a monomer.

When component (B) is a random copolymer derived from two different multi-functional monomers, the monomers may be for example two of the monomers selected from above such as dimethylolpropionic acid and α,α-bis(hydroxymethyl)butyric acid.

Preferably, at least one of the multi-functional monomers is dimethylolpropionic acid (2,2-bis(hydroxymethyl) propionic acid, or BMPA).

The terminal lipophilic groups may be for example straight or branched chain alkyl of 1 to 100 carbon atoms, straight or branched chain alkenyl of 1 to 100 carbon atoms, straight or branched chain alkynyl of 1 to 100 carbon atoms, cycloalkyl of 5 to 12 carbon atoms, polycycloalkyl of 14 to 112 carbon atoms, phenylalkyl of 7 to 15 carbon atoms, phenylalkenyl of 7 to 15 carbon atoms or phenylalkynyl of 7 to 15 carbon atoms.

Preferably, the terminal lipophilic groups are straight or branched chain alkyl, alkenyl or alkynyl, each of 14 to 22 carbon atoms.

Examples where the lipophilic groups are polycycloalkyl groups are polynorbornene and hydrogenated polynorbornene.

The lipophilic groups are derived from the appropriate mono or di-functional alkyl, alkenyl, alkynyl or cycloalkyl group with one or two reactive groups (d), wherein (d) is reactive with group (c) of the multi-functional monomer and/or the hyperbranched structure. Reactive group (d) has the same definition as groups (a), (b) and (c).

The terminal lipophilic groups may, for example, be derived from mono- or di-carboxylic acids, or where appropriate, reactive equivalents of carboxylic acids such as anhydrides or acid chlorides. Examples of suitable precursors for the lipophilic groups are acetic acid, propionic acid, butyric acid, valeric acid, isobutyric acid, trimethylacetic acid, caproic acid, caprylic acid, heptanoic acid, capric acid, pelargonic acid, lauric acid, myristic acid, palmitic acid, stearic acid, behenic acid, lignoceric acid, ceratic acid, montanoic acid, isostearic acid, isononanoic acid, 2-ethylhexanoic acid, oleic acid, ricinoleic acid, linoleic acid, linolenic acid, erucic acid, soybean fatty acid, linseed fatty acid, dehydrated castor fatty acid, tall oil fatty acid, tung oil fatty acid, sunflower fatty acid, safflower fatty acid, acrylic acid, methacrylic acid, maleic anhydride, orthophthalic anhydride, terephthalic acid, isophthalic acid, adipic acid, azelaic acid, sebacic acid, tetrahydrophthalic anhydride, hexahydrophthalic anhydride, succinic acid and polyolefin carboxylic acids.

Preferably, the lipophilic groups are derived from straight or branched chain alkylcarboxylic acids of 14 to 22 carbon atoms.

Most preferably the lipophilic groups are derived from myristic acid, stearic acid, isostearic acid and behenic acid.

Further, the terminal lipophilic groups need not be equivalent, i.e., the copolymers of this invention may comprise terminal lipophilic groups that are the same or different. The lipophilic groups then are derived from more than one mono or di-functional alkyl, alkenyl, alkynyl or cycloalkyl groups as defined above.

Accordingly, the linkages formed between (A) and (B) and which are focal points for the branching structure of the copolymer, and the linkages formed between (B) and the terminal lipophilic groups may be for example —O—, —S—, —SO2—, —CO$_2$—, —CONH—, —CONR—, —NH—, —NR—, —OCO$_2$—, —COS—, —CSO—, —CS$_2$—, —NHCONH—, —NHCSNH— and —OCH$_2$CHOHCH$_2$OCO—. Most commonly the linkages between (A) and (B) and between (B) and the terminal lipophilic groups are —OCO—.

As mentioned, the hyperbranched sections of the block copolymers of this invention are random and irregular and contain failure sequences. They contain linear and fully branched repeating units. For example, an (A)(B) copolymer of this invention, wherein component (A) is derived from poly(ethylene glycol) monomethyl ether (MPEG), component (B) is derived from dimethylolpropionic acid, the terminal lipophilic groups are derived from an alkylcarboxylic acid (RCOOH) and the ratio of dimethylolpropionic acid monomer units to MPEG is 5, will comprise a mixture, among other perturbations, of the following branched and linear structures:

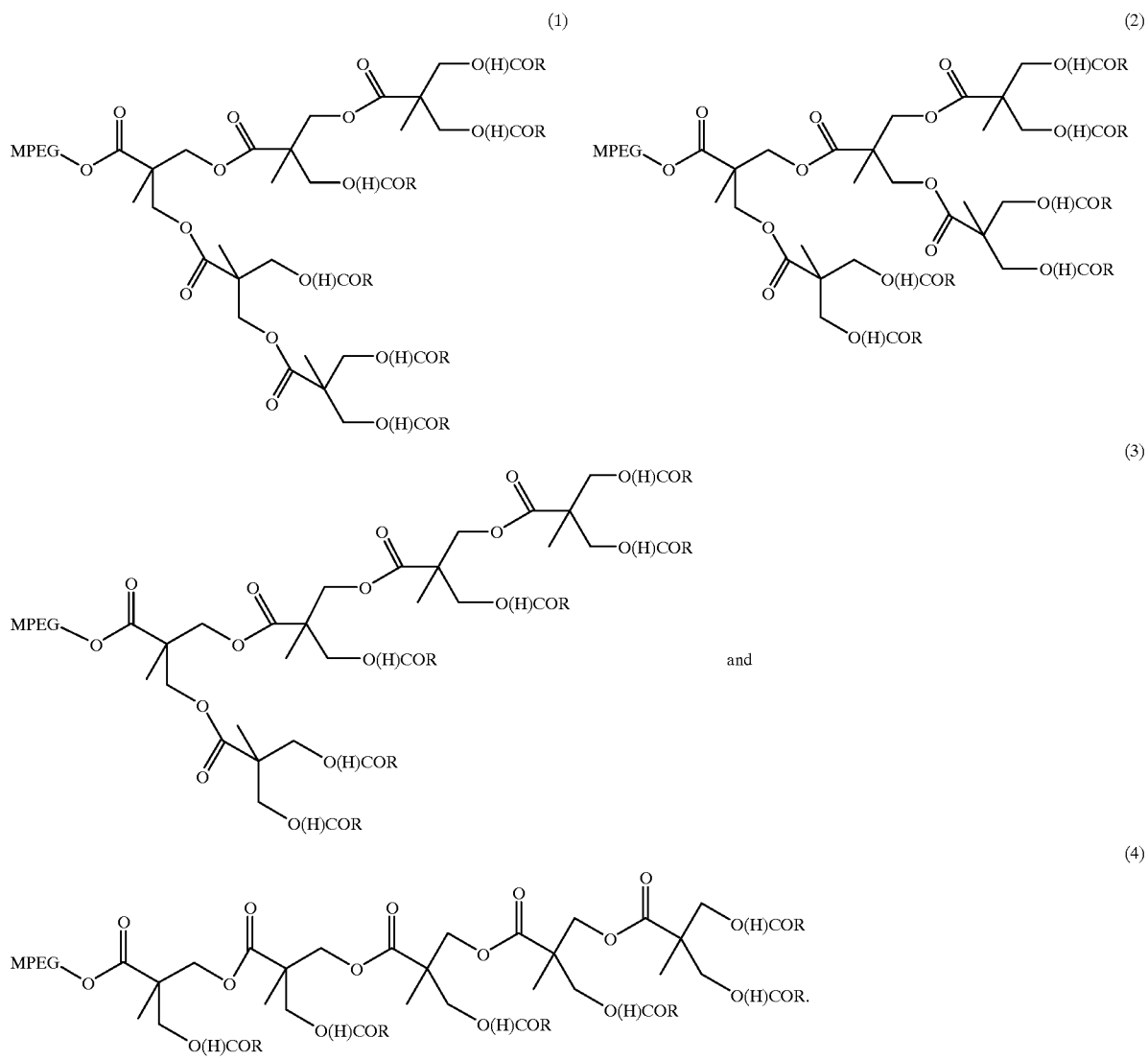

It can be seen that the copolymer of the instant invention comprises a complex mixture where component (B) is fully branched, partially branched and linear.

Preferably, the ratio of monomer units of each component (B) to the polymer or oligomer component (A) in the block copolymers of this invention is from about 1 to 1 to about 100 to 1. Most preferably, the ratio is about 1 to 1 to about 10 to 1.

Another subject of this invention is the process for the preparation of the novel block copolymers disclosed herein.

Surprisingly, it has been discovered that a one-pot, one-step synthesis, in which all three ingredients, the linear polymer or oligomer precursor for component (A), the multi-functional monomer precursor or precursors for component (B) and the precursor or precursors for the lipophilic terminating groups are added together at one time provides for effective conditions for the preparation of the block copolymers of this invention.

Where the preferred precursors for preparation of the (A)(B) block copolymers of this invention are employed, for example where component (A) is derived from poly (ethylene glycol) monomethyl ether, component (B) is derived from dimethylolpropionic acid and the terminal lipophilic groups are derived from stearic acid or isostearic acid, the reactions between the precursors, i.e. coupling reactions, are esterification reactions with the condensation of water. Therefore preferably the process is an esterification process with the condensation of water.

The process may also be employed where the precursors have reactive groups other than alcohols and carboxylic acids, for example transesterification reactions, or reactions involving amides, amines or acid chlorides.

If more than one monomer precursor for component (B) is employed, the different monomers may or may not be reactive with each other. If they are reactive with each other, component (B) will be a random copolymer or cooligomer. If they are not reactive with each other, component (B) will be a homopolymer or homooligomer. In this instance mixtures of different (A)(B) and (B)(A)(B) block copolymers will result. In the case of (B)(A)(B) copolymers, the (B) groups may or may not be formed from the same monomer.

The reaction time may vary widely depending on conditions such as temperature, the nature of the reactants from which the components (A), (B) and the lipophilic groups are derived, and the stoichiometries of these reactants. In the preferred esterification process, the reaction is complete when the acid number during the course of the reaction levels off, i.e. is no longer decreasing. Generally, a typical reaction is complete within the range of about 5 hours to about 30 hours.

In the preferred esterification process of the present invention water formed during the reaction is continuously removed by known methods such as azeotropic distillation, vacuum distillation, sparging with an inert gas and the like.

In the preferred esterification process, an esterification catalyst is present in the reaction mixture at a level of about 0.1 to about 2 percent by weight based on the entire reaction mixture. Preferably the esterification catalyst is present in the reaction mixture at a level of about 0.2 to about 1 percent by weight of the entire reaction mixture. The esterification catalyst may be any commonly known such catalyst, for example protic acids, Lewis acids, titanates, zinc catalysts and tin catalysts.

In the preferred one-pot esterification process of this invention, the reactions are performed in the temperature range from about 140° C. to about 220° C. Most preferably, the process is performed in the temperature range from about 160° C. to about 190° C.

Protic acid catalysts are for example naphthalenesulfonic acid, para-toluenesulfonic acid (p-TSA), methanesulfonic acid, trifluoromethanesulfonic acid, trifluoroacetic acid, sulfuric acid or phosphoric acid. A titanate catalyst is for example tetrabutyl titanate. A zinc catalyst is for example zinc powder or an organozinc compound. A tin catalyst is for example tin powder or an organotin compound.

In the present process, the molar ratio of the monomer precursor or precursors for component (B) to the reactive functional groups (a) of the precursor for component (A) is about 1:1 to about 100:1 and the molar ratio of the precursor or precursors for the lipophilic groups to the monomer precursor or precursors for component (B) is about 1:5 to about 2:1.

One outcome of the process of this invention is that the resulting amphiphilic block copolymers are random and irregular and contain failure sequences, such as unreacted hydroxyl moieties in the case of a hydroxyl-bearing monomer.

The novel block copolymers of this invention are especially effective as additives that increase the surface energy of polymers, polymer blends and polymer composites (polymer substrates). It has been found that the linear hydrophilic polymer or oligomer portion of the block copolymer migrates to the surface of the polymer substrate. The terminal lipophilic groups, which are compatible with the polymer substrate, act as "molecular anchors" and secure the additive to the surface of the substrate. In some cases where the terminal lipophilic groups of the copolymer additive are not equivalent, the affinity of the additive for the substrate may be enhanced.

Accordingly, another subject of this invention are novel compositions comprising I.) one or more (A)(B) or (B)(A)(B) amphiphilic block copolymers wherein
(A) is a linear hydrophilic polymer or oligomer,
(B) is a random hyperbranched polymer or oligomer, and
wherein said block copolymers are completely or partially terminated with lipophilic groups, and II.) a polymeric substrate,
wherein the surface energy or hydrophilicity of the polymeric substrate is increased.

The polymeric substrate may be, for example, a polyolefin, polystyrene, polyester, polyamide, polyether, polysulfone, polycarbonate, polyurea, polyurethane and polysiloxane and any mixture of these polymers.

Preferably the polymeric substrate is a polyolefin, for example polyethylene and polypropylene.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, Ia and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/odene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Preferred polyolefins are polyethylene or polypropylene and their copolymers with mono- and diolefins.

Polystyrenes of the invention include styrene-butadiene copolymers and block copolymers, ABS, IPS and styrene-isoprene copolymers and block copolymers.

In addition to component I.), the novel compositions may comprise further additives (stabilizers) such as, for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis [6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy 2-methylphenyl)-4-n-dodecylmercaptobutane, 1,1,5,5-tetra-(5-tert-butyl-4-hydroxy-2-methylphenyl)pentane.

1.7. o-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)- malonate, di-dodecylmercaptoethyl-2,2-bis-(3,5-di-tert-butyl-4-hydroxybenzyl)malonate, bis[4-(11,1,3,3-tetramethylbutyl) phenyl]-2,2-bis(3,5-di-tert-butyl-4-hydroxybenzyl)malonate.

1.9. Aromatic hydroxybenzyl compounds, for example 1,3, 5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3, 5-di-tert-butyl-4-hydroxybenzyl)phenol.

1.10. Triazine compounds, for example 2,4-bis (octylmercapto)-6-(3,5-di-tert-butyl-4-hydroxyanilino)-1, 3,5-triazine, -2-octylmercapto-4,6-bis(3,5-di-tert-butyl-4-hydroxyanilino) -1,3,5-triazine, 2-octylmercapto-4,6-bis (3,5-di-tert-butyl-4-hydroxyphenoxy)-1,3,5-triazine, 2,4,6 -tris(3,5-di-tert-butyl-4-hydroxyphenoxy)-1,2,3-triazine, 1,3,5-tris-(3,5-di-tert-butyl-4-hydroxy-benzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl) isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.14. Esters of β-(5-tert-butyl-4-hydroxy-3-methylphenyl) propionic acid with mono-or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1 -phospha-2,6,7-trioxabicyclo [2.2.2] octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl] oxamide (Naugard® XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-napthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)propane, (o-tolyl)biguanide, bis[4-(1', 3'-dimethylbutyl)phenyl]amine, tert-octylated N-phenyl-1naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N', N'-tetraphenyl-1,4-diaminobut-2-ene, N,N-bis (2,2,6,6-tetramethyl-piperid-4-yl-hexamethylenediamine, bis(2,2, 6,6-tetramethylpiperid-4-y-sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)benzotriazoles, for example 2-(2-hydroxy-5-methylphenyl)-benzotriazole, 2-(3,5-di-tert-butyl-2-hydroxyphenyl)benzotriazole, 2-(5-tert-butyl-2-hydroxyphenyl)benzotriazole, 2-(2-hydroxy-5-(1,1,3,3-tetramethylbutyl)phenyl)benzotriazole, 2-(3,5-di-tert-butyl-2-hydroxyphenyl)-5-chloro-benzotriazole, 2-(3-tert-butyl-2-hydroxy-5-methylphenyl)-5-chloro-benzotriazole, 2-(3-sec-butyl-5-tert-butyl-2-hydroxyphenyl)benzotriazole, 2-(2-hydroxy-4-octyloxyphenyl)benzotriazole, 2-(3,5-di-tert-amyl-2-hydroxyphenyl)benzotriazole, 2-(3,5-bis-(α,α-dimethylbenzyl)-2-hydroxyphenyl)benzotriazole, 2-(3-tert-butyl-2-hydroxy-5-(2-octyloxycarbonylethyl) phenyl)-5-chloro-benzotriazole, 2-(3-tert -butyl-5-[2-(2-ethylhexyloxy)-carbonylethyl]-2-hydroxyphenyl)-5-chloro-benzotriazole, 2-3-tert-butyl-2-hydroxy-5-(2-methoxycarbonylethyl)phenyl)-5-chloro-benzotriazole, 2-(3-tert-butyl-2-hydroxy-5-(2-methoxycarbonylethyl)

phenyl)benzotriazole,2-(3-tert-butyl-2-hydroxy-5-(2-octyloxycarbonylethyl)phenyl)benzotriazole, 2-(3-tert-butyl-5-[2-(2-ethylhexyloxy)carbonylethyl]-2-hydroxyphenyl)benzotriazole, 2-(3-dodecyl-2-hydroxy-5-methylphenyl)benzotriazole, 2-(3-tert-butyl-2-hydroxy-5-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3-tert-butyl-5-(2-methoxycarbonylethyl)-2-hydroxyphenyl]-2H-benzotriazole with polyethylene glycol 300;

where
R=3'-tert-butyl-4'-hydroxy-5'-2H-benzotriazol-2-ylphenyl, 2-[2-hydroxy-3-(α,α-dimethylbenzyl)-5-(1,1,3,3-tetramethylbutyl)-phenyl]-benzotriazole; 2-[2-hydroxy-3-(1,1,3,3-tetramethylbutyl)-5-(α,α-dimethylbenzyl)-phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2', 4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-ββ-diphenylacrylate, methyl α-carbomethoxycinnamate, methyl α-cyano-β-methyl-p-methoxy-cinnamate, butyl (α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxy ethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(43,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-amino-propylamino the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1 -bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4 '-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'- ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4, 6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis (2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxy -propyloxy)phenyl]-4,6-bis(2,4-dimethylphenyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1 ,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{ 2-hydroxy- 4-[3-(2-ethylhexyl-1 -oxy)-2-hydroxypropyloxy]phenyl ]-4,6-bis(2,4-dimethylphenyl)-1,3,5-triazine, 4,6-bis(2,4-dimethylphenyl)-2-[2-hydroxy-4-(2-hydroxy-3-nonyloxypropoxy)-5-(1-methyl-1-phenylethyl)phenyl]-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis (salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f] [1,3,2]dioxaphosphepin, 6-fluoro-2,4,8, 10-tetra-tert-butyl-12-methyl-dibenzo[d,g] [1,3,2] dioxaphosphocin, bis(2,4-di-tert-butyl-6-methylphenyl) methyl phosphite, bis(2,4-di-tert-butyl-6-methylphenyl) ethyl phosphite, 2,2', 2"-nitrilo [triethyltris(3,3',5,5'-tetra-tert-butyl-1,1'-biphenyl-2,2'-diyl)phosphite], 2-ethylhexyl (3,3', 5,5'-tetra-tert-butyl-1,1'-biphenyl-2,2'-yl)phosphite.

Especially Preferred are the Following Phosphites:

Tris(2,4-di-tert-butylphenyl) phosphite (Irgafos®168, Ciba Specialty Chemicals Corp.), tris(nonylphenyl) phosphite, (A)

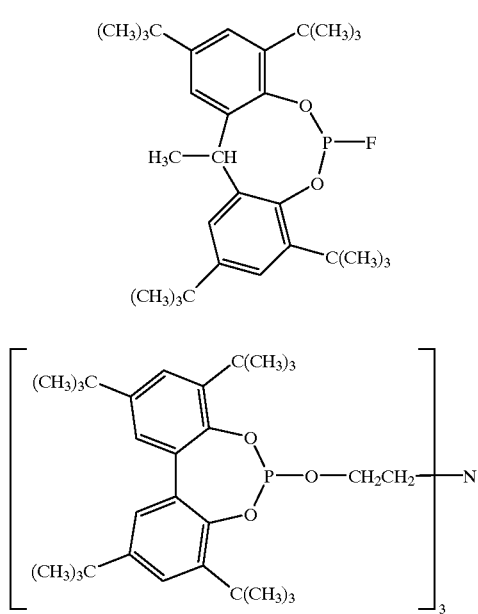

(B)

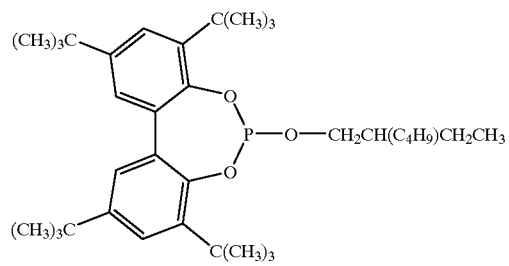

(C)

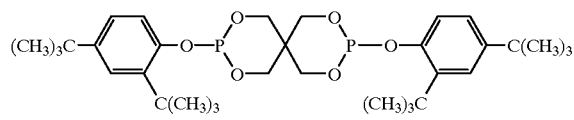

(D)

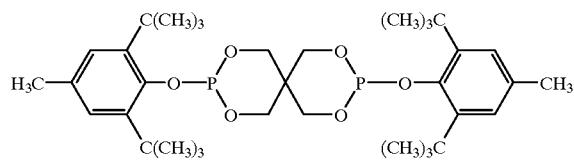

(E)

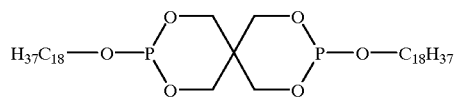

(F)

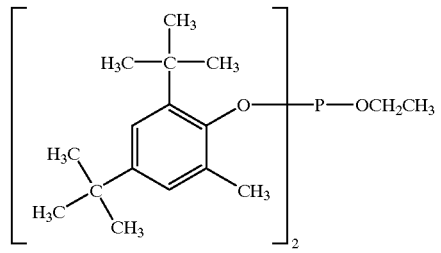

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N- dialkylhydroxylamine derived from hydrogenated tallow amine.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone,N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-hep-tadecyl-nitrone, N-octadecyl-alpha-hexadecyl-nitrone, nitrone derived from N,N-dialkylhydro-xylamine derived from hydrogenated tallow amine.

7. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy}-phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl)benzofuran-2-one, 3-(4-acetoxy-3,5-dimethylphenyl)-5,7 -di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-ditert-butyl-benzofuran-2-one.

9. Thiosynergists, for example dilauryl thiodipropionate or distearyl thiodipropionate.

10. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

11. Polyamide stabilizers, for example copper salts in combination with iodides and/or phosphorus compounds and salts of divalent manganese.

12. Basic co-stabilizers, for example melamine, polyvinylpyrrolidone, dicyandiamide, triallyl cyanurate, urea derivatives, hydrazine derivatives, amines, polyamides, polyurethanes, at kali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

14. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

15. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifying agents and blowing agents.

The amphiphilic block copolymer additives of component I.) are advantageously present in the compositions of this invention from about 0.1 to about 20 percent by weight based on the total weight of components I.) and II.), preferably from about 0.5 to about 5 percent by weight.

The amphiphilic block copolymer additives of this invention and optional further additives may be applied to or incorporated in the polymeric substrate by any known methods, e.g. by melt blending, solution blending, solution casting and adsorption from solution.

For example, component I.) and optional further additives may be incorporated in the polymeric substrate before or after molding or also by applying the dissolved or dispersed additive mixture to the polymeric substrate, with or without subsequent evaporation of the solvent. Component I.) and optional further additives can also be added to the polymeric substrate in the form of a masterbatch which contains these components in a concentration of, for example, about 2.5% to about 25% by weight.

For example, component I.), optional further additives and the polymeric substrate may all be dissolved in a mutually compatible solvent wherein the concentration of polymer in the solvent ranges from about 5 to about 50% by weight of the solvent. The solution may then be dried at an appropriate temperature to produce a cast film containing a blend of polymer and the additive(s).

Alternatively, additive compounds of component I.) and optional further additives are blended into a polymeric substrate by dissolving the additive(s) in a volatile solvent to provide a solution with an additive concentration of about 5 to about 50% by weight. The solution is then mixed with the polymer and the mixture is dried thereby providing polymer particles which are substantially evenly coated with additive (s). The coated polymer particles may then be fed to an extruder wherein the mixture is melt blended and extruded to produce an extrudate containing the polymeric substrate and additive(s).

If in a liquid form, the additives of component I.) may be applied directly to polymer particles by stirring the polymer particles in the liquid additive mixture until the additive mixture is evenly dispersed on the surface of the polymer particles. The polymer may then be fed to an extruder to produce an extrudate of polymer substrate containing the additives.

The compositions of this invention may also be prepared by submitting the additives of component I.), optional further additives and solid polymeric material to an extruder followed by melt blending and extruding the molten mixture. Alternatively, the polymeric material and additives may be melt blended in a thermostatted vessel where the components are in molten form, followed by cooling of the mixture.

As the material cools, at least a portion of the additives of component I.) migrates to the surface of the polymeric substrate thereby modifying the surface properties thereof. The additives of component I.) are persistent in the polymeric substrate, and consequently the surface properties are substantially permanently modified.

Component I.) and optional further additives can also be added before or during the polymerization or before crosslinking.

Component I.) and optional further additives can be incorporated into the polymeric substrate in pure form or encapsulated in waxes, oils or polymers.

Component I.) and optional further additives can also be sprayed or coated onto the polymeric substrate. It may be used to dilute other additives (for example the conventional additives indicated above) or their melts so that it can be sprayed or coated together with these additives onto the polymeric substrate. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply component I.) optionally together with other additives, by spraying.

Preferably, component I.) and optional further additives are incorporated into the polymeric substrate of component II.) by melt blending. As mentioned, under melt blending conditions, the block copolymer additives of component I.) migrate to the surface of the formed polymer substrate.

The polymeric compositions of this invention, which have increased surface energy or hydrophilicity, may exhibit improved properties in the areas of, for example, anti-fog, dissipation of static electricity, paintability, dyeability, printability, wicking of moisture, adhesion, compatibility with immiscible polymers, biocompatibility and biodegradibility.

The polymeric articles or constructions, which comprise components I.) and II.), and which benefit from the application or incorporation of the amphiphilic block copolymers of this invention include carpet fibers, composite fibers, agricultural films, nonwoven coverstock, exterior automotive bumper fascia, packaging, hygienic products, membranes such as semipermeable, dialysis and reverse osmosis membranes, incompatible polymer blends, laminated articles and eyewear.

The polymer blends that may be compatibilized with the incorporation of the amphiphilic block copolymers of this invention include blends of polystyrene with polyesters, polystyrene with polyamides, polyolefins with polyesters and polyolefins with polyamides.

The amphiphilic block copolymers of this invention are also effective as rheology modifiers and dispersants for pigments and fillers. Articles that would benefit include solvent and water borne paints.

Anti-fog properties are important in greenhouse applications. A greenhouse is required to be closed during cold periods to contain heat to maintain a growing environment. With high humidity inside the greenhouse, this creates a situation where water condenses on the inside of greenhouse roof or cover when the temperature of the roof or cover is reduced to the dew point or lower. A greenhouse film made from an olefinic polymer is hydrophobic and has low surface tension, which causes condensed water to coalesce into droplets. This unwanted condition, where water condensate forms on the surface of the film as free droplets, is known as "fogging." Fogging prevents the transmission of sunlight and may fall onto and damage the crop below. Compositions of the present invention have superior anti-fog properties. Anti-fogging properties are also important in food overwrap (meat, vegetables, etc.) or other applications where a clear film with wettability or non-fogging is needed.

Hyperbranched polymers similar to those described herein, but without component (A) are also useful in the compositions of this invention. That is to say, a random hyperbranched polymer or oligomer component (B) as described above that is completely or partially terminated with lipophilic groups. Many of these hyperbranched polymers are novel. For example, the condensation reaction products of dimethylolpropionic acid reacted with each of myristic acid, stearic acid, isostearic acid and behenic acid or mixtures thereof.

The following Examples illustrate the invention in more detail. They are not to be construed as limiting the instant invention in any manner whatsoever. The invention is declared to cover all changes and modifications of the specific examples which do not constitute departure from the spirit and scope of the invention.

EXAMPLE 1

Preparation of Amphiphilic Block Copolymers

A series of various amphiphilic block copolymers of the present invention are prepared according to the following general procedure. Comparative examples of linear amphiphilic polymers are prepared by the same procedure with the exclusion of the multi-functional monomer. The comparative amphiphilic polymers are represented by numbers 1 and 2 of Table 1 and are representative of state of the art nonionic surfactants employed for increasing the surface energy of polyolefins. The copolymers of the instant invention are represented by numbers 3-25. The linear hydrophilic polymer component (A) is derived from either poly(ethylene glycol) monomethyl ether (MPEG) or poly(ethylene glycol) (PEG), and is represented in Table 1 by the symbol "A". The molecular weight ($\overline{M}n$, daltons) of the hydrophilic polymer component is given in Table 1. The random hyperbranched component(B) is derived from dimethylolpropionic acid [2,2-bis(hydroxymethyl)propionic acid (BMPA)]. The lipophilic terminal groups are derived from the corresponding long-chain alkylcarboxylic acid ("LCA" in Table 1). The use of stearic acid results in a $C_{17}H_{35}$ lipophilic group. The last column of Table 1 represents the ratio of components employed in the preparation of the corresponding copolymer. The copolymers of the instant invention comprise a mixture of structures as discussed supra and similar to compounds of formulae (1)-(4).

A reactor is charged with 89.9 g (316 mmol) of stearic acid, 31.8 g (237 mmol) of BMPA, and 27.8 g (79 mmol) of $MPEG_{350}$ ($\overline{M}n$ 350 daltons, eq. wt. 349). Under a constant flow of nitrogen the temperature of the solid mixture is increased to 110° C., at which point the solid mixture becomes a homogeneous colorless liquid. Stirring is initiated and the reaction is allowed to purge for 30 min., and then 750 mg (3.9 mmol) of p-toluenesulfonic acid are added. The reaction temperature is increased to 160° C. Water of condensation immediately collects in a trap attached to the reactor. After 4 h, the reaction temperature is increased between 180-190° C. Stirring at this temperature is continued until the acid number shows little appreciable decrease. Stirring is stopped and the hot liquid is poured into a glass container and allowed to equilibrate to room temperature under ambient conditions. The structure of the (A)(B) block copolymer of the instant invention is confirmed by $^{1}H$, $^{13}C$ FT-NMR spectroscopy, size exclusion chromatography (SEC), and differential scanning calorimetry (DSC). $\overline{M}n=1400$, $\overline{M}w/\overline{M}n=1.2$, Tm=44° C., acid number=29.0 mg KOH/g, hydroxyl number=31.5 mg KOH/g, yield is quantitative.

Likewise, the structures of the other (A)(B) or (B)(A)(B) block copolymers of the instant invention, as well as the comparative linear copolymers, are confirmed by the same analytical techniques.

TABLE 1

| Amphiphilic Copolymer | Type | LCA | A, $\overline{M}n$ | LCA:A:B |
|---|---|---|---|---|
| 1 | linear | $C_{33}H_{67}CO_2H$ | MPEG, 350 | 1:1:0 |
| 2 | linear | $C_{33}H_{67}CO_2H$ | PEG, 1000 | 2:1:0 |
| 3 | (A)(B) | $C_{13}H_{27}CO_2H$ | MPEG, 350 | 4:1:3 |
| 4 | (A)(B) | $C_{13}H_{27}CO_2H$ | MPEG, 550 | 4:1:3 |
| 5 | (A)(B) | $C_{13}H_{27}CO_2H$ | MPEG, 750 | 4:1:3 |
| 6 | (A)(B) | $C_{13}H_{27}CO_2H$ | MPEG, 1900 | 4:1:3 |
| 7 | (A)(B) | $C_{13}H_{27}CO_2H$ | MPEG, 5000 | 4:1:3 |
| 8 | (A)(B) | $C_{17}H_{35}CO_2H$ | MPEG, 350 | 4:1:3 |
| 9 | (A)(B) | $C_{17}H_{35}CO_2H$ | MPEG, 550 | 4:1:3 |
| 10 | (A)(B) | $C_{17}H_{35}CO_2H$ | MPEG, 750 | 4:1:3 |
| 11 | (A)(B) | $C_{17}H_{35}CO_2H$ | MPEG, 1900 | 4:1:3 |
| 12 | (A)(B) | $C_{17}H_{35}CO_2H$ | MPEG, 5000 | 4:1:3 |
| 13 | (A)(B) | i-$C_{17}H_{35}CO_2H$ | MPEG, 350 | 4:1:3 |
| 14 | (A)(B) | i-$C_{17}H_{35}CO_2H$ | MPEG, 750 | 4:1:3 |
| 15 | (A)(B) | $C_{21}H_{43}CO_2H$ | MPEG, 350 | 4:1:3 |
| 16 | (A)(B) | $C_{21}H_{43}CO_2H$ | MPEG, 550 | 4:1:3 |
| 17 | (A)(B) | $C_{21}H_{43}CO_2H$ | MPEG, 750 | 4:1:3 |

TABLE 1-continued

| Amphiphilic Copolymer | Type | LCA | A, $\overline{M}n$ | LCA:A:B |
|---|---|---|---|---|
| 18 | (A)(B) | $C_{21}H_{43}CO_2H$ | MPEG, 1900 | 4:1:3 |
| 19 | (A)(B) | $C_{21}H_{43}CO_2H$ | MPEG, 5000 | 4:1:3 |
| 20 | (B)(A)(B) | $C_{33}H_{67}CO_2H$ | PEG, 1000 | 4:1:2 |

EXAMPLE 2

Preparation of Amphiphilic Block Copolymers

According to the general procedure described in Example 1, a series of (A)(B) amphiphilic block copolymers of the present invention are prepared. The linear hydrophilic polymer component is derived from poly(ethylene glycol) monomethyl ether with an $\overline{M}n$ of 350 daltons and is represented by the symbol "P". The random hyperbranched component is derived from dimethylolpropionic acid (2,2-bis(hydroxymethyl)propionic acid (BMPA)). The lipophilic terminal groups are derived from isostearic acid as the long-chain alkylcarboxylic acid ("LCA"). Amphiphilic (A)(B) block copolymers of the present invention are prepared using the following ratios of LCA:P:BMPA: 1:1:1, 2:1:1, 1:1:2, 2:1:2, 3:1:2, 1:1:3, 2:1:3, 3:1:3, 4:1:3, 1:1:4, 2:1:4, 3:1:4, 4:1:4, 5:1:4, 1:1:5, 2:1:5, 3:1:5, 4:1:5, 5:1:5, 6:1:5, 7:1:6, and 8:1:7.

EXAMPLE 3

According to the general procedure described in Example 1, a series of (A) (B) amphiphilic block copolymers of the present invention are prepared. Amphiphilic block copolymers are prepared using all of the ratios of LCA:P:BMPA of Example 2 for each of the following combinations of precursors for the lipophilic group and component (A). The random hyperbranched component is derived from dimethylolpropionic acid (2,2-bis (hydroxymethyl)propionic acid (BMPA)).

a.) myristic acid, poly(ethylene glycol) monomethyl ether (MPEG) with an $\overline{M}n$ of 350 daltons,
b.) myristic acid, MPEG with an $\overline{M}n$ of 550 daltons,
c.) myristic acid, MPEG with an $\overline{M}n$ of 750 daltons,
d.) stearic acid, MPEG with an $\overline{M}n$ of 350 daltons,
e.) stearic acid, MPEG with an $\overline{M}n$ of 550 daltons,
f.) stearic acid, MPEG with an $\overline{M}n$ of 750 daltons,
g.) isostearic acid, MPEG with an $\overline{M}n$ of 550 daltons,
h.) isostearic acid, MPEG with an $\overline{M}n$ of 750 daltons,
i.) behenic acid, MPEG with an $\overline{M}n$ of 350 daltons,
j.) behenic acid, MPEG with an $\overline{M}n$ of 550 daltons, and
k.) behenic acid, MPEG with an $\overline{M}n$ of 750 daltons.

EXAMPLE 4

According to the general procedure described in Example 1, a series of (A)(B) amphiphilic block copolymers of the present invention are prepared. Amphiphilic block copolymers are prepared using all of the ratios of reactants of Example 2 for each of the combinations of precursors for the lipophilic group and component (A) as set forth in Example 3. The random hyperbranched component is derived from a 1:1 mixture of dimethylolpropionic acid (2,2-bis (hydroxymethyl)propionic acid (BMPA)) and α,α-bis (hydroxymethyl)butyric acid.

EXAMPLE 5

According to the general procedure described in Example 1, a series of (B)(A)(B) amphiphilic block copolymers of the present invention are prepared. The linear hydrophilic polymer component is derived from poly(ethylene glycol) with an $\overline{M}n$ of 750 daltons and is represented by the symbol "P". The random hyperbranched component is derived from dimethylolpropionic acid (2,2-bis(hydroxymethyl)propionic acid (BMPA)). The lipophilic terminal groups are derived from isostearic acid as the long-chain alkylcarboxylic acid ("LCA"). Amphiphilic (B)(A)(B) block copolymers of the present invention are prepared using the following ratios of LCA:P:BMPA: 2:1:2, 4:1:2, 2:1:4, 4:1:4, 6:1:4, 2:1:6, 4:1:6, 6:1:6, 8:1:6, 2:1:8, 4:1:8, 6:1:8, 8:1:8, 10:1:8, 2:1:10, 4:1:10, 6:1:10, 8:1:10, 10:1:10, 12:1:10, 14:1:12, and 16:1:14.

EXAMPLE 6

Contact Angle Measurements in Compression Molded LDPE Plaques

Compression molded 10 mil plaques of copolymer additives of Table 1 in low density polyethylene (Dow Chemical LDPE 6401) are prepared as follows. The additives and substrate are initially blended by melt compounding in a twin-screw extruder. Plaques of the blends are made by compression molding against steel at 4000° F.

Receding water contact angles of the compression molded plaques are measured using a Kruss K12 dynamic contact angle tensiometer. This method, often referred to as the Wilhelmy plat technique, measures the force of wetting of a solid by a liquid (usually water) as it is initially immersed and subsequently withdrawn. This wetting force is then translated into receding (withdrawn) contact angles. It is generally accepted by those skilled in the art that receding contact angles are a measure of a materials' hydrophilic character.

The receding angles of the plaques are measured immediately after compression molding. They are rubbed five times with a water moistened paper towel and the receding angle is measured again. The plaques are stored at 70° F. with a relative humidity of 30–40%. The receding angles of the plaques are monitored over the course of 30 days. Comparison of the receding angles before and after rubbing gives a qualitative measure of the immediate persistence and relative modifying strength of the additive, while the 30 day monitoring study provides insight as to the additive's relative long-term persistence. The smaller the value of the receding angle, the greater the surface energy of the LDPE plaque.

TABLE 2

Receding Contact Angles of LDPE Compression Molded Plaques Made with Steel Mold Surfaces

| Amphiphilic Copolymer | % (w/w) | Initial Before Rub | Initial After Rub | Aged (days) 5 | 10 | 30 |
|---|---|---|---|---|---|---|
| None | — | 78.3 | 75.6 | 68.8 | 72.2 | 72.9 |
| 1 | 1.0 | 47.0 | 56.3 | 50.9 | 54.8 | 55.3 |
| 2 | 1.0 | 29.8 | 51.1 | 49.5 | 49.8 | 57.6 |
| 8 | 1.0 | 35.9 | 40.4 | 38.9 | 38.2 | 44.3 |
| 20 | 1.0 | 43.7 | 52.9 | 46.3 | 52.4 | 55.0 |
| 20 | 3.0 | 14.8 | 33.1 | 30.4 | 37.4 | 45.3 |

It can be seen that the amphiphilic block copolymers of this invention, represented by numbers 8 and 20 are effective towards increasing the surface energy of polyethylene. For comparison of compounds of the instant invention to nonionic surfactants representative of the state of the art, 20 should be compared to 2 and 8 should be compared to 1. It can be seen that the compounds of the instant invention increase the surface energy of LDPE to a greater degree than compounds representative of the state of the art and/or they are more persistent in the substrate.

EXAMPLE 7

Contact Angle Measurements in LDPE Blown Films

When Example 6 is repeated in LDPE Blown Films, the compounds of the instant invention increase the surface energy of LDPE to a greater degree than compounds representative of the state of the art and/or they are more persistent in the substrate as measured by receding, static or advancing contact angles.

EXAMPLE 8

Polypropylene Fiber Dyeability

Fiber grade polypropylene, Montell PROFAX 6301, and the appropriate amount of additive are mixed on a TURBULA mixer for 15 minutes. The blended mix is added to a SUPERIOR MPM single screw lab extruder at 425, 450, 475 and 475° F., screw speed is 80 rpm. The molten polypropylene with additive exits a round die, is cooled in a water trough and is fed into a CONAIR JETRO pelletizer. The compounded pellets are fed into a HILLS LAB FIBER EXTRUDER with a 41 hole delta spinneret at 450, 475, 500 and 525° F. A constant pressure of 750 psi controls the screw speed via a feed back loop. The feed, draw, and relax rolls are at 175, 212 and 212° F., and are rotating at 120, 400 and 383 meters per minute. The fiber comes in contact with a 6% aqueous fiber finish solution just before the feed roll. This solution is LUROL PP-4521 from Goulston Indstries. A LEESONA winder at the end of the line collects the fiber onto a spool. The final denier per filament is 15. The collected fiber is removed from the spool and is knitted into a sock with a LAWSON HEMPHILL FAK sampler knitter.

Solutions of dyes are prepared at 1.0 g/L in distilled water in separate containers. For disperse dyes this is done by heating water to 145–185° F., then adding water to the dye. The solutions of the acid dyes are made by heating water to 185–212° F. The solutions of the leveler, lubricant and pH control chemicals are made at room temperature at a 10% w/w level.

A ROACHES programmable dye bath is set to the following conditions:

Disperse dye for PP: Temperature rise of 3.5° C. per minute to 98° C. with a hold time of 60 minutes at 98° C. then a cool down at maximum cooling of 5.5° C. per minute.

Acid dye for PP: Temperature rise of 3.5° C. per minute to 98° C. with a hold time of 30 minutes at 98° C. then a cool down at maximum cooling of 5.5° C. per minute.

The appropriate amounts of the solutions (see Dye Solutions Table) are added to a steel 500 mL cylinder based on a 5.0 g weight of sock. The sock is identified with a laundry tag and is placed in the cylinder. The cylinder is filled with distilled water. The pH is checked and should be 4–5 for disperse dyeing and 6–6.5 for acid dyeing. Finally the cylinders are sealed and placed into the dye bath and the cycle is started. After the dye cycle is completed, the socks are removed from the cylinders and are rinsed with tap water. The excess water is removed from the socks via a centrifuge and are dried in a forced air oven at 212° F. for 15 minutes.

Lightness and darkness (L) of the socks are measured on a Datacolor Spectrophotometer SF600. L is a measure of light and dark on a scale of 0 (dark) to 100 (light). Instrument conditions are CIE lab, D65, 10 deg, SCI, SAV, UV400-700. Results are found in Table 2. A lower L value indicates improved dyeability.

| Dye Solutions | |
|---|---|
| Disperse Dye | % Weight on Fiber |
| Yellow K-GL | 0.5 |
| Red K-BB | 0.5 |
| Blue K-RB | 1.0 |
| UNIVADINE DIF | 2.0 |
| CIBAFLUID UA | 1.0 |
| Acetic Acid | 0.5 |

| Disperse Dyeability | | | |
|---|---|---|---|
| Formulation | LCA | A, Mn | L value |
| A | | | 54 |
| B | i-$C_{17}H_{35}CO_2H$ | MPEG 750 | 21 |
| C | $C_{21}H_{43}CO_2H$ | MPEG 350 | 22 |
| D | $C_{21}H_{43}CO_2H$ | MPEG 1900 | 30 |

Formulation A contains no additive. Formulation B contains 5% by weight amphiphilic copolymer 14 of Example 1 based on the weight of polypropylene. C contains 5% by weight copolymer 15 of Example 1. D contains 5% by weight copolymer 18 of Example 1.

Formulations B, C, and D, containing additives of the present invention, impart improved dyeability to polypropylene socks compared to socks containing no additive.

The crocking test method determines the degree of color which may be transferred from the surface of a dyed article to other surfaces by rubbing. Such dye transfer is undesirable. The test requires specific rubbing, via a crockmeter, with both a dry and a wet white test cloth across the dyed article. The cloths are then evaluated via the gray scale. The gray scale is a 5 unit scale (1-5 @ 0.5 divisions), with 5 representing negligible dye transfer.

To qualify as a successful additive to promote polypropylene (PP) dyeability, the sock containing the additive will dye to a dark shade as would be expected of a polyester (PET) control, there should be no or negligible dye transfer when being evaluated by the crocking test, and there should be no loss of physical properties.

The socks containing the amphiphilic block copolymers of the present invention show excellent dyeability as evidenced by low L values and acceptable wet and dry crock values.

EXAMPLE 9

Anti-fog Properties of LDPE Blown Films

Amphiphilic block copolymer additives 3–5, 8–10 and 14 of Example 1 are added to low density polyethylene having a melt index of 2.0 dg/min. and a density of 0.922 g/mL at 10% by weight, based on the weight of polymer, and the mixture is blended in a Brabender. The polymer melt temperature is 150° to 170° C. The polymer mixtures are pelletized to give a masterbatch. Granules of the masterbatch are tumble-blended with granules of low density polyethylene at the weight ratio of 1 to 9 (the resulting concentration of the anti-fogging agent in the low density polyethylene polymer is 10,000 ppm). A film with a thickness of about 75 micrometers is produced on a tubular blown film line at a melt temperature of about 210° C.

The anti-fogging test method tests the ability of the film surface to retain its anti-fogging property after exposure to moisture under cold (4° C.) and hot (60° C.) temperature conditions.

For the cold-fog test, 200 mL of water is put in a 250 mL beaker and the test film is placed on the beaker so as to cover the entire opening. The beaker is then placed in a temperature controlled cabinet at 4° C. Anti-fog evaluations are done in predetermined time intervals up to 7 days For the hot-fog test, 50 mL of water is put in a 250 mL beaker and the test film is placed on the beaker so as to cover the entire opening. The beaker is then placed in a bath containing water at 60° C. Anti-fog evaluations are done in predetermined time intervals up to 3 hours.

Anti-fogging ratings are as follows:

High fogging: 1

Moderate fogging: 2

Fogged in patches: 3

Few large drops: 4

Clear, no drops: 5

Polyethylene film containing the amphiphilic block copolymer additives of the present invention have superior anti-fogging properties relative to films with no surfactant additive and with state-of-the-art additives such as Atmer® 103.

What is claimed is:

1. An (A)(B) or a (B)(A)(B) amphiphilic block copolymer wherein (A) is a linear hydrophilic polymer or oligomer, (B) is a random hyperbranched polymer or oligomer, wherein said block copolymer is completely or partially terminated with lipophilic groups, and wherein hyperbranched component (B) is derived from at least one multi-functional monomer wherein said monomer or monomers have one reactive group (b) and two or more reactive groups (c) wherein reactive groups (b) and (c) are reactive with each other under condensation conditions.

2. An amphiphilic block copolymer according to claim 1 in which component (A) is derived from a mono or di-functional homopolymer, block copolymer, random copolymer or alternating copolymer selected from the group consisting of the poly(acrylate)s, poly(methacrylate)s, polyesters, poly(alkylene diol)s, poly(alkylene diol) monoalkyl ethers, poly(aryl ether)s, poly(vinyl alcohol)s, poly(acrylamide)s, poly(urea)s, poly(urethane)s, poly(methacrylamide)s, poly(ethylene imine)s, poly(vinyl ether)s, poly(vinyl ester)s, poly(epichlorohydrin), poly(glycidyl ether)s, poly(glycidyl ester)s, poly(carbonate)s, poly(thio ether)s, poly(thio ester)s, poly(alkyl sulfone)s, poly(aryl sulfone)s,poly(amino acid)s, polyamides, epoxy resins, novolac resins and quaternary ammonium polyacrylates and polyamines.

3. An amphiphilic block copolymer according to claim 2 in which component (A) is derived from a linear homopolymer with an $\overline{M}n$ between 300 and 500,000 daltons.

4. An amphiphilic block copolymer according to claim 2 in which component (A) is derived from a linear homopolymer with an $\overline{M}n$ between 300 and 5,000 daltons and which is selected from the group consisting of the poly(acrylate)s, poly(methacrylate)s, poly(alkylene diol)s, poly(alkylene diol) monoalkyl ethers, poly(aryl ether)s, poly(acrylamide)s, poly(methacrylamide)s, poly(ethylene imine)s, poly(vinyl ether)s and poly(vinyl ester)s.

5. An amphiphilic block copolymer according to claim 4 in which component (A) is derived from the group consisting of poly(ethylene glycol)s, poly(propylene glycol)s, poly(ethylene glycol) monoalkyl ethers and poly(propylene glycol) monoalkyl ethers.

6. An amphiphilic (A)(B) block copolymer according to claim 5 in which component (A) is derived from a poly(ethylene glycol) monoalkyl ether.

7. An amphiphilic block copolymer according to claim 1 wherein hyperbranched component (B) is a random copolymer or cooligomer derived from at least two different monomers.

8. An amphiphilic block copolymer according to claim 1 wherein hyperbranched component (B) is derived from at least one multi-functional monomer wherein said monomer or monomers have one group (b) and two groups (c) wherein (b) is a carboxylic acid group and (c) is a hydroxyl group.

9. An amphiphilic block copolymer according to claim 8 wherein one of said monomers is dimethylolpropionic acid.

10. An amphiphilic block copolymer according to claim 7 wherein hyperbranched component (B) is derived from dimethylolpropionic acid and α,α-bis(hydroxymethyl)butyric acid.

11. An amphiphilic block copolymer according to claim 1 wherein the ratio of monomer units of each component (B) to the polymer or oligomer component (A) is from about 1 to 1 to about 100 to 1.

12. An amphiphilic block copolymer according to claim 1 in which the terminal lipophilic groups are independently straight or branched chain alkyl of 1 to 100 carbon atoms, straight or branched chain alkenyl of 1 to 100 carbon atoms, straight or branched chain alkynyl of 1 to 100 carbon atoms, cycloalkyl of 5 to 12 carbon atoms, polycycloalkyl of 14 to 112 carbon atoms, phenylalkyl of 7 to 15 carbon atoms, phenylalkenyl of 7 to 15 carbon atoms or phenylalkynyl of 7 to 15 carbon atoms.

13. An amphiphilic block copolymer according to claim 12 in which the terminal lipophilic groups are independently straight or branched chain alkyl of 14 to 22 carbon atoms, straight or branched chain alkenyl of 14 to 22 carbon atoms or straight or branched chain alkynyl of 14 to 22 carbon atoms.

14. An amphiphilic block copolymer according to claim 13 in which the terminal lipophilic groups are derived from myristic acid, stearic acid, isostearic acid or behenic acid.

15. An amphiphilic (A)(B) block copolymer according to claim 1 in which component (A) is derived from poly(ethylene glycol) monomethyl ether which has a $\overline{M}n$ between 300 and 5,000 daltons, component (B) is derived from dimethylolpropionic acid or dimethylolpropionic acid and α,α-bis(hydroxymethyl)butyric acid and the terminal lipophilic groups are derived from stearic acid or isostearic acid.

16. A one-pot, one-step process for the preparation of (A)(B) or (B)(A)(B) amphiphilic block copolymers, which process comprises adding the precursor for component (A) containing one or two reactive functional groups (a), the multi-functional monomer precursor or precursors for component (B) and the precursor or precursors for the lipophilic terminating groups to a reaction vessel at one time and heating the mixture to form said amphiphilic block copolymers, wherein (A) is a linear hydrophilic polymer or oligomer, (B) is a random hyperbranched polymer or oligomer, wherein said block coploymers are completely or partially terminated with lipophilic groups, and wherein said monomer precursor or precursors have one reactive group (b) and two or more reactive groups (c) wherein reactive groups (b) and (c) are reactive with each other under condensation conditions.

17. A process according to claim 16 wherein at least two different monomer precursors for component (B) are added to said reaction vessel.

18. A process according to claim 16 which is an esterification process in which para-toluenesulfonic acid is added as a catalyst together with the precursors of the amphiphilic block copolymers.

19. A process according to claim 16 in which the molar ratio of the monomer precursor or precursors for component (B) to the reactive functional groups (a) of the precursor for component (A) is about 1:1 to about 100:1 and the molar ratio of the precursor or precursors for the lipophilic groups to the monomer precursor or precursors for component (B) is about 1:5 to about 2:1.

* * * * *